Nov. 13, 1928.
C. H. A. TEIBER
1,691,789
SPECTACLES
Filed June 24, 1926
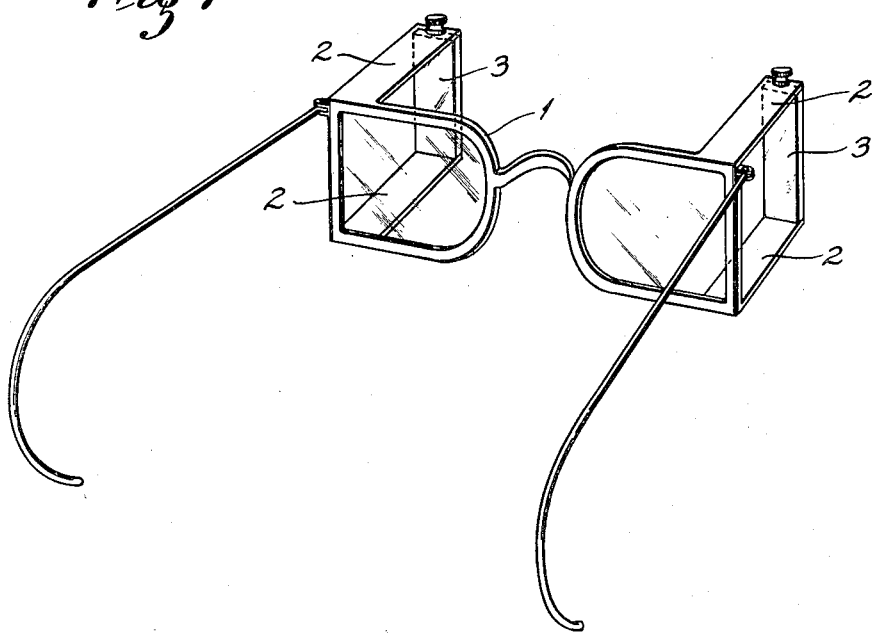
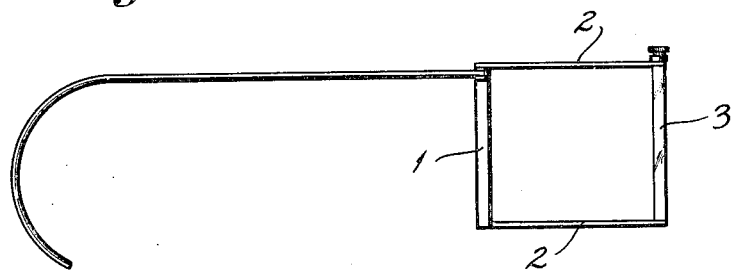
INVENTOR:
C. H. A. TEIBER
BY Elliott & Harrington
ATTORNEYS.

Patented Nov. 13, 1928.

1,691,789

UNITED STATES PATENT OFFICE.

CHARLES HENRY ALBERT TEIBER, OF ST. LOUIS, MISSOURI.

SPECTACLES.

Application filed June 24, 1926. Serial No. 118,228.

This invention relates generally to spectacles, and particularly to improved spectacles which include as parts thereof means in the form of reflectors whereby objects behind the wearer of the spectacles may be reflected into the vision of said wearer.

My improved spectacles are intended particularly for drivers of vehicles whose safety depends to a large extent on a knowledge of traffic behind their vehicles, and also for pedestrians in zones where there is a congestion of vehicular traffic, and the predominant object of the invention is to produce neat and attractive spectacles of the type described which will permit of the wearer seeing what is behind him while he is looking in a forward direction.

An important feature of my invention resides in the fact that while the reflectors forming parts of the improved spectacles perform an extremely useful and important function, a consideration which would offset any slight tendency said reflectors had to mar the appearance of the spectacles, still said reflectors do not have this tendency, it having been found that spectacles made in accordance with my invention are just as attractive in appearance as are spectacles of the type heretofore used.

Figure 1 illustrates a perspective view of my improved spectacles;

Figure 2 is a side elevation of the spectacles shown in Fig. 1.

In the drawing 1 designates the frame of my improved spectacles which comprises the usual lens-receiving portions in which lenses are arranged, nose or bridge piece, and foldable temples. The frame shown in the drawing is constructed as were the frames heretofore employed, the only unusual feature regarding said frame being that the outer ends of the frame and of the lenses supported thereby are straight instead of curved, as is usually the case. However, it is obvious that if desired, the particular shape of the lens-receiving portions of the frame shown need not be adhered to, as it would be entirely possible to make said portions of the frame of other shapes.

Extended forwardly from each of the lens-receiving portions of the spectacle frame 1 at the outer ends thereof is a pair of arms 2, each pair of arms associated with a lens-receiving portion of the frame being spaced from each other in a direction transversely of the frame and each pair of associated arms preferably comprising an arm rigidly fixed at the top and a similar arm rigidly fixed at the bottom of the associated lens-supporting portion of the frame. The spaced arms 2 may be in the form of separate elements which are secured to the frame of the spectacles in any convenient manner, or said arms may be formed as integral parts of the spectacle frame.

Interposed between the outer ends of each associated pair of arms 2 at the opposite ends of the frame 1 is a suitable reflecting device such as a mirror 3. The mirrors 3 at the opposite ends of the frame 1 are relatively narrow with respect to the width of the lens and said mirrors are disposed adjacent to the extreme outer ends of the lenses so that they do not interfere in any way with the vision through said lenses. The mirrors 3 are each adjustably supported by the associated arms 2, said mirrors being movable about their longitudinal axes. The particular means for supporting the mirrors so that they may be adjusted about their longitudinal axes is not important inasmuch as several arrangements for this purpose may be employed. I prefer to provide each mirror with an adjusting screw which is arranged above the upper of the supporting arms, whereby said mirrors may be conveniently adjusted. In view of the adjustable arrangement of the mirrors 3, the angles of said mirrors may be adjusted with relation to the eyes of the wearer of the spectacles, whereby the extent of the rear vision of the wearer of the spectacles may be regulated. Also, the mirrors together with their supporting arms are so arranged that they do not extend beyond the outer ends of the spectacle frame.

I claim:

1. Spectacles comprising a frame supporting a pair of lenses, pairs of spaced arms located at the opposite ends of said frame and extended forwardly therefrom, said pairs of spaced arms comprising each an arm fixed to said frame at the upper portion thereof and an arm fixed to said frame at the lower portion thereof, and reflectors interposed between and supported by said pairs of arms at the forward ends thereof, said arms being permanently attached to said frame and being arranged substantially at right angles to said frame at the extreme opposite ends thereof and said reflectors being relatively narrow with respect to the lenses of the spectacles, so that the vision through said lenses will not be interfered with by said reflectors.

2. Spectacles comprising a frame supporting a pair of lenses, pairs of spaced arms located at the opposite ends of said frame and extended forwardly therefrom, said pairs of spaced arms comprising each an arm rigidly fixed to said frame at the upper portion thereof and an arm rigidly fixed to said frame at the lower portion thereof, reflectors interposed between and adjustably supported by the outer portions of said pairs of arms, and adjusting screws whereby said reflectors may be adjusted about their vertical axes, said reflectors being relatively narrow with respect to the lenses of the spectacles, whereby the vision through said lenses is not interfered with by said reflectors, and said supporting arms being arranged substantially at right angles to the spectacle frame at both ends thereof.

CHARLES HENRY ALBERT TEIBER, M. D.